United States Patent [19]

Ball et al.

[11] 4,175,115

[45] Nov. 20, 1979

[54] PROCESS FOR THE PRODUCTION OF SYNTHESIS GAS BY THE CATALYZED DECOMPOSITION OF METHANOL

[75] Inventors: William J. Ball, Capel; David G. Stewart, Epsom, both of England

[73] Assignee: The British Petroleum Company Limited, London, England

[21] Appl. No.: 909,979

[22] Filed: May 26, 1978

[30] Foreign Application Priority Data

Jul. 27, 1977 [GB] United Kingdom ............... 31538/77

[51] Int. Cl.$^2$ ........................ C01B 31/18; C01B 1/13
[52] U.S. Cl. ........................... 423/415 A; 423/648 R; 252/373
[58] Field of Search ............... 423/415, 415 A, 648 R, 423/656; 252/373

[56] References Cited

U.S. PATENT DOCUMENTS

| | | | |
|---|---|---|---|
| 2,010,427 | 8/1935 | Eversole | 423/415 A |
| 3,338,681 | 8/1967 | Kordesch | 423/651 |
| 3,454,364 | 7/1969 | Sturm et al. | 423/651 |
| 3,469,944 | 9/1969 | Bocard et al. | 252/373 X |
| 3,515,514 | 6/1970 | Holmes et al. | 252/373 X |
| 4,046,522 | 9/1977 | Chew | 252/373 X |
| 4,088,450 | 5/1978 | Kosaka et al. | 252/373 X |
| 4,091,086 | 5/1978 | Hindin et al. | 252/373 X |

*Primary Examiner*—Earl C. Thomas
*Attorney, Agent, or Firm*—Brooks, Haidt, Haffner & Delahunty

[57] ABSTRACT

Synthesis gas is produced by contacting methanol in the vapor phase with a catalyst which is a supported metal of Group VIII of the Periodic Table either alone or in combination with one or more other metals from Groups I to VIII, excluding binary combinations of copper and nickel, typically at a temperature in the range 200° to 600° C. and at a pressure in the range 0 to 50 atmospheres. The best results are achieved with a mixture of rhodium and copper supported on silica, a 100% molar yield of carbon monoxide on methanol fed being obtained at 450° C., atmospheric pressure and 3.5 second contact time.

19 Claims, No Drawings

PROCESS FOR THE PRODUCTION OF SYNTHESIS GAS BY THE CATALYZED DECOMPOSITION OF METHANOL

The present invention relates to a new and improved process for the production of synthesis gas by the catalytic decomposition of methanol. The term synthesis gas is generally used to describe various mixtures of carbon monoxide and hydrogen which find utility in a variety of chemical reactions.

The production of hydrogen and carbon monoxide by the catalytic decomposition of methanol is indicated by the following reaction.

$$CH_3OH \rightleftharpoons CO + 2H_2$$

Although in the past attention has principally been directed towards converting synthesis gas into products such as methanol, it is now envisaged that there will be a need in the near future to convert methanol into synthesis gas. This is being brought about by the many projects to manufacture methanol on a very large scale in certain favourable locations e.g. the Middle East, followed by the transport of methanol in bulk to sites where a ready supply of synthesis gas is required for further processing. Such a scheme is very advantageous, because methanol is a non-corrosive liquid under normal conditions and can consequently be shipped without difficulty or danger over greater distances. In addition, there is a growing awareness of the great potential of methanol as a starting material for chemicals production based on carbonylation and hydroformylation reactions, e.g. in acetic acid and oxo alcohol production.

The decomposition of methanol was studied in the early part of this century, principally because it was considered that the catalyst mixture which gave the maximum decomposition into carbon monoxide and hydrogen would be particularly suitable for the synthesis of methanol from these gases under pressure. (Industrial and Engineering Chemistry 20, (7), page 694, (1928),). Most of these studies were of an academic nature and were mainly concerned with zinc-containing catalysts (e.g. Journal of Catalysis, 27, pages 471, (1972) ).

A study directed towards a process for the production of synthesis gas was reported in Industrial and Engineering Chemistry 40, (4) page 583, (1948). In this, methanol is decomposed to carbon monoxide and hydrogen over a Filtros supported mixture of copper and nickel oxides maintained at a temperature in the range 350° to 400° C. The synthesis gas produced by this method was never more than 97% pure, the by-products being 0.2% carbon dioxide and 2% inerts, including nitrogen and gaseous hydrocarbons. A major disadvantage of this process was the high rate of carbon deposition and because of this the catalyst required frequent regenerations.

Improved catalysts for converting methanol into carbon monoxide and hydrogen have now been found.

Thus according to the present invention there is provided a process for the production of hydrogen and carbon monoxide which process comprises contacting methanol in the vapour phase with a catalyst comprising a supported metal of Group VIII of the Periodic Table either alone or in combination with one or more other metals from Groups I to VIII of the Periodic Table, excluding binary combinations of copper and nickel, under reaction conditions which result in the formation of hydrogen and carbon monoxide.

The Periodic Table referred to throughout this specification is that contained in the Handbook of Chemistry and Physics, 44th Edition, published by the Chemical Rubber Publishing Company in 1963.

Methanol is available commercially on a very large scale and using the present process, this material can readily be converted into a stream of synthesis gas for further down-stream processing. It is preferred to use anhydrous methanol in the process because the presence of water makes the efficient production of a carbon monoxide and hydrogen mixture much more difficult. On the other hand the methanol may be diluted with carbon monoxide, carbon dioxide or hydrogen. Furthermore the feed can be diluted with recycle carbon monoxide and hydrogen. Since the decomposition of methanol is endothermic the use of diluents offers a convenient method for introducing heat into the reaction.

Supports which may suitably be used include silica, alumina and mixtures thereof, titania, zirconia and zeolites, both natural and synthetic. The preferred support is silica.

It will be appreciated that although the catalyst may be introduced into the reaction zone as a supported metal compound or mixture of metal compounds, under the conditions pertaining during the course of the reaction such components may well be chemically reduced. In such circumstances the precise chemical nature of the catalyst at any time during the reaction is not known with any degree of certainty, with the result that the catalyst can only be characterised by reference to the metals it contains. Group VIII metals, which in combination with a support, are found to be particularly effective include, for example, rhodium and cobalt, both alone and in combination with other metals. The Group VIII metal may be admixed with one or more other Group VIII metals and/or with metals of Groups I to VII of the Periodic Table, such as iron, copper, chromium, gold and zinc. A particularly preferred catalyst is a mixture of rhodium and copper supported on silica.

The catalyst may be prepared by impregnating the support with a solution of a compound of the metal in a suitable solvent, such as water, and thereafter removing the solvent. The catalyst may also be prepared by methods known to those skilled in the art, for example, by precipitation from solutions of the metal salts. The supported metal catalyst may suitably contain from 0.1 to 20%, preferably from 0.2 to 10% by weight of the metal or metals.

Reaction conditions which result in the formation of hydrogen and carbon monoxide are a temperature in the range 200 to 600, preferably 300° to 450° C. and a pressure in the range 0 to 50 atmospheres. Since the decomposition of methanol is equilibrium limited it is preferred to employ high temperatures in combination with high pressures.

The process may be operated batchwise or continuously, continuous operation being preferred. The contact time as hereinafter defined, for continuous operation may be up to 30, preferably from 1 to 5 seconds. For the purpose of this specification the contact time is defined as follows:

$$\frac{\text{Volume of catalyst in milliliters}}{\text{Total volume of gas (in milliliters/second at N.T.P.)}}$$

The catalyst may be present as a fixed bed or a fluidised bed.

The decomposition of methanol produces 2 volumes of hydrogen for every volume of carbon monoxide. The hydrogen/carbon monoxide mixture so-produced may be treated, in a manner well-known to those skilled in the art, in order to alter the hydrogen/carbon monoxide ratio, i.e. by the so-called "shift reaction".

The mixture of hydrogen and carbon monoxide produced by the process may be used in a variety of ways. Representative of the utility of the mixture is the following:

(i) The production of acetic acid by the carbonylation of methanol in the presence of rhodium catalysts.

(ii) utilisation of the hydrogen content of the product, optionally incorporating a hydrogen shift reaction, as a refineries feed stream or in the operation of fuel cells.

(iii) conversion of the gaseous mixture in a conventional manner to methane or substitute natural gas.

(iv) the production of OXO alcohols i.e. the carbonylation of olefins to alcohols, aldehydes etc.

(v) the production of gasoline-type hydrocarbons in a Fischer-Tropsch-type reaction (vi) in metallurgical processing as a reducing gas and (vii) as a low Btu fuel gas.

It will be appreciated of course that many of the aforementioned reactions may be carried out without actually isolating the hydrogen/carbon monoxide mixture.

The invention will now be illustrated by reference to the following Examples.

EXAMPLES

Preparation of Catalysts

Catalyst A

Davison silica, grade 59 (8–10 mesh B.S.S. granules)

Catalyst B

Cobalt nitrate hexahydrate (2.5 g) was dissolved in deionised water (25 g) and the resulting solution was added to Davison grade 59 silica (10 g, 8–10 mesh B.S.S.). The mixture was evaporated to dryness on a steam-bath with stirring and finally dried at 120° C. for 16 hours.

Catalyst C

Prepared as described for Catalyst B using rhodium trichloride trihydrate (2.5 g) and Davison grade 59 silica (10 g, 8–10 mesh B.S.S.)

Catalyst D

Prepared as described for catalyst B using nickel nitrate hexahydrate (2.5 g) and Davison grade 59 silica (10 g, 8–10 mesh B.S.S.).

Catalyst E

Prepared as described for catalyst B using rhodium trichloride trihydrate (10.2 g), ferric nitrate nonahydrate (0.4 g) and Davison grade 59 silica (20 g, 8–10 mesh B.S.S.).

Catalyst F

Rhodium acetate (1.9 g) and ferric nitrate nonahydrate (0.4 g) were dissolved in warm concentrated nitric acid (25 ml) and deionised water (50 ml) was added to the resulting solution. The mixture was added to Davison grade 59 silica (20 g, 8–10 mesh B.S.S.) and the whole evaporated to dryness on a steam-bath with stirring and finally dried at 120° C. for 16 hours.

Catalyst G

Prepared as described for Catalyst B using rhodium trichloride trihydrate (1.3 g) chloro-auric acid (0.08 g, containing 48% gold) and Davison grade 59 silica (10 g, 8–10 mesh B.S.S.)

Catalyst H

Prepared as described for catalyst B using rhodium trichloride trihydrate (1.3 g), chromiun trichloride hexahydrate (0.21 g) and Davison grade 59 silica (10 g, 8–10 mesh B.S.S.).

Catalyst I

Prepared as described for catalyst B using rhodium trichloride trihydrate (1.3 g), cobalt nitrate hexahydrate (0.2 g) and Davison grade 59 silica (10 g, 8–10 mesh B.S.S.).

Catalyst J

Prepared as described for catalyst B using rhodium trichloride trihydrate (1.3 g) cupric chloride dihydrate (0.11 g) and Davison grade 59 silica (10 g, 8–10 mesh B.S.S.)

Catalyst K

Prepared as described for catalyst B using rhodium trichloride trihydrate (1.3 g), nickel chloride hexahydrate (0.16 g) and Davison grade 59 silica (10 g, 8–10 mesh B.S.S.)

Catalyst L

Thorium nitrate hexahydrate (10 g) was dissolved in deionised water (40 ml) and the resulting solution was added to Davison grade 59 silica (20 g, 8–10 mesh). The resulting mixture was evaporated to dryness on a steam-bath with stirring, dried at 120° for 16 hours and finally heat-treated at 400° C. for 4 hours in a stream of air.

Ferric nitrate hexahydrate (0.89 g), rhodium acetate (0.5 g), ruthenium chloride (0.5 g), palladium acetate (0.5 g) and iridium chloride (0.5 g) were dissolved in warm concentrated nitric acid (25 ml) and deionised water (50 ml) was added to the resulting solution. The mixture was added to the thorium impregnated silica and the whole was evaporated to dryness on a steam-bath with stirring, dried at 120° C. for 16 hours and finally heat-treated at 400° C. for 4 hours in a stream of air.

EXAMPLES 1 TO 12

The catalysts were tested by passing a gaseous feed of methanol over the catalyst in a heated tubular reactor at atmospheric pressure. The conditions used and the yields of carbon monoxide, methane and carbon dioxide obtained are given in the following Table.

Carbon monoxide, methane and carbon dioxide were analysed by gas chromatography using a thermal conductivity detector and hydrogen was determined by difference. In Example 2 the hydrogen: carbon monoxide ratio was confirmed by mass spectroscopic analysis.

For the purpose of this specification the molar yield of a particular product is defined as follows:

$$\frac{\text{Mole of methanol converted to a particular product}}{\text{Moles of methanol fed}} \times 100$$

TABLE

| Example No. | Catalyst | Reaction Temperature °C. | Contact Time Sec. | % Molar Yields on Methanol Fed | | | $H_2$:CO Ratio |
|---|---|---|---|---|---|---|---|
| | | | | Carbon Monoxide | Methane | Carbon Dioxide | |
| 1* | A | 300 | 3.5 | NIL | NIL | NIL | |
| | | 450 | | NIL | NIL | NIL | |
| 2 | B | 325 | 3.5 | 20.9 | 0.2 | 0.2 | 1.9 |
| | | 369 | | 56.5 | 1.1 | 0.5 | 2.0 |
| | | 400 | | 78.6 | 3.8 | 2.2 | 2.0 |
| 3 | C | 306 | 3.9 | 9.3 | 0.1 | 0.1 | 2.0 |
| | | 348 | | 20.5 | 0.6 | 0.3 | 2.0 |
| 4 | D | 260 | 3.5 | 16.5 | 0.2 | 0.1 | 1.8 |
| | | 280 | | 29.0 | 0.6 | 0.2 | 1.9 |
| | | 300 | | 39.8 | 0.8 | 0.7 | 1.9 |
| | | 330 | | 79.0 | 4.7 | 0.5 | 1.9 |
| | | 365 | | 59.8 | 20.4 | 8.9 | 2.1 |
| 5 | E | 300 | 3.9 | 28.5 | 0.4 | NIL | Not determined |
| | | 350 | | 58.9 | 1.4 | NIL | |
| 6 | F | 261 | 3.9 | 30.2 | 0.3 | 0.2 | 2.0 |
| | | 304 | | 81.7 | 2.1 | 0.2 | 2.0 |
| | | 338 | | 83.4 | 7.6 | 2.0 | 2.0 |
| 7 | G | 304 | 3.9 | 7 | NIL | NIL | 2.0 |
| | | 456 | | 93.3 | 7.2 | 0.8 | 1.7 |
| 8 | H | 306 | 3.9 | 13.2 | 0.2 | 0.1 | 2.0 |
| | | 356 | | 31.5 | 0.7 | 0.1 | 2.0 |
| | | 456 | | 93.5 | 4.9 | 0.7 | 1.9 |
| 9 | I | 306 | 2.4 | 26.7 | NIL | NIL | 1.9 |
| | | 450 | | 75.3 | 1.4 | 0.3 | 1.8 |
| 10 | J | 300 | 3.5 | 4.3 | NIL | NIL | 2.0 |
| | | 365 | | 49.0 | NIL | NIL | 2.0 |
| | | 450 | | 100.0 | NIL | NIL | 2.0 |
| 11 | K | 300 | 3.5 | 25.4 | 0.3 | 0.1 | 2.0 |
| | | 330 | | 49.4 | 1.0 | 0.1 | 1.9 |
| | | 365 | | 75.1 | 2.5 | 0.2 | 1.9 |
| | | 400 | | 89.6 | 3.9 | 0.4 | 1.8 |
| | | 426 | | 91.1 | 7.8 | 1.2 | 1.8 |
| 12 | L | 267 | 3.3 | 25.4 | 0.3 | 0.3 | 2.0 |
| | | 356 | | 83.5 | 6.2 | 2.5 | 2.0 |

*Example 1 is not an example according to the present invention and is included for the purpose of comparison.

We claim:

1. A process for the production of hydrogen and carbon monoxide comprising contacting essentially anhydrous methanol in the vapor phase with a supported catalyst at a temperature in the range of about 200° to 600° C., a pressure in the range of from about 0 to 50 atmospheres and a contact time up to 30 seconds, said supported catalyst containing a metal of Group VIII of the Periodic Table and another metal of Group IB, Group II, Group VIB or Group VIII of the Periodic Table, excluding binary combinations of copper and nickel, and said metals constituting from 0.1 to 20% by weight of said catalyst.

2. A process according to claim 1 wherein said methanol is anhydrous.

3. A process according to claim 1 wherein said methanol is diluted with a diluent selected from carbon monoxide, carbon dioxide and hydrogen.

4. A process according to claim 1 wherein said support is selected from silica, alumina, a mixture of silica and alumina, titania, zirconia, natural zeolites and synthetic zeolites.

5. A process according to claim 1 wherein said support is silica.

6. A process according to claim 1 wherein said metal of Group VIII of the Periodic Table is selected from rhodium and cobalt.

7. A process according to claim 1 wherein said supported catalyst contains one or more metals selected from Group VIII of the Periodic Table in combination with one or more metals selected from the group consisting of iron, copper, chromium, gold and zinc.

8. A process according to claim 1 wherein said catalyst is a mixture of rhodium and copper supported on silica.

9. A process according to claim 1 wherein said metal constitutes from 0.2 to 10% by weight of the catalyst.

10. A process according to claim 1 wherein said temperature is in the range 300° to 450° C.

11. A process according to claim 1 wherein said contact time is in the range 1 to 5 seconds.

12. A process as defined in claim 1 wherein said metal of Group VIII of the Periodic Table in rhodium.

13. A process as defined in claim 12 wherein said other metal is iron.

14. A process as defined in claim 12 wherein said other metal is chromium.

15. A process as defined in claim 12 wherein said other metal is gold. pg,17

16. A process as defined in claim 12 wherein said other metal is cobalt.

17. A process as defined in claim 12 wherein said other metal is copper.

18. A process as defined in claim 12 wherein said other metal is nickel.

19. A process as defined in claim 12 wherein said other metal is thorium.